United States Patent [19]

Cella et al.

[11] Patent Number: 5,610,259
[45] Date of Patent: Mar. 11, 1997

[54] RTV SILICONES COMPRISING DIFUNCTIONAL ORGANOSILICON COMPOUNDS

[75] Inventors: James A. Cella, Clifton Park; Timothy B. Burnell, Schenectady, both of N.Y.

[73] Assignee: General Electric Company, Schenectady, N.Y.

[21] Appl. No.: 588,946

[22] Filed: Jan. 19, 1996

Related U.S. Application Data

[63] Continuation-in-part of Ser. No. 387,695, Feb. 13, 1995, abandoned.

[51] Int. Cl.$^6$ ........................................ C08G 77/04
[52] U.S. Cl. ........................ 528/34; 528/37; 528/17; 528/18
[58] Field of Search ........................ 528/34, 18, 17

[56] References Cited

U.S. PATENT DOCUMENTS 3,694,427   9/1972   Jonas et al. ................. 528/33
4,960,847  10/1990   Arai et al. ................... 528/32

FOREIGN PATENT DOCUMENTS 0153377   7/1987   European Pat. Off. .
0423685  10/1990   European Pat. Off. .
06279979  3/1991   Japan .
1310761   3/1973   United Kingdom .

*Primary Examiner*—Melvyn I. Marquis
*Attorney, Agent, or Firm*—William H. Pittman

[57] ABSTRACT

Room temperature vulcanizable organopolysiloxane compositions comprising derivatives of silacycloalkanes are described and they unexpectedly display a reduction in viscosity prior to curing, a reduction in modulus after curing and favorable cure rates.

10 Claims, No Drawings

RTV SILICONES COMPRISING DIFUNCTIONAL ORGANOSILICON COMPOUNDS

This invention was made with government support under Contract No. N61533-93-C-0062 awarded by the U.S. Government. The government has certain rights in this invention.

This application is a continuation in part of U.S. Ser. No. 08/387,695, filed Feb. 13, 1995, entitled "RTV Silicones Comprising Difunctional Organosilicon Compounds" and abandoned.

FIELD OF THE INVENTION

This invention relates to novel compositions of matter. More particularly, the invention is directed to room temperature vulcanizable organopolysiloxane compositions comprising derivatives of silacycloalkanes, and the compositions unexpectedly display, among other things, a reduction in viscosity prior to curing, a reduction in modulus after curing and favorable cure rates.

BACKGROUND OF THE INVENTION

Room temperature vulcanizing silicone elastomers (RTVs) typically display favorable characteristics which include, for instance, excellent electrical properties as well as resistance to temperature extremes and weathering. Moreover, RTVs are often supplied as caulking materials and pourable liquids and they typically find wide uses as sealants for a variety of commercial applications.

RTVs conventionally cure by condensation, and in the uncured form, they typically display high viscosities which makes them difficult to handle and/or apply. The high viscosities are derived from the fact that the RTVs, in the uncured state, utilize a high molecular weight polymer to ensure that when crosslinking occurs, a cured composition having low modulus and high elongation results. To compensate for such high viscosities, environmentally unfriendly solvents are often employed to thin the RTV compositions so that they may be brushed on and/or sprayed in commercial applications.

It is of increasing interest to prepare compositions that do not require solvents in order to be easily handled and/or applied. The instant invention, therefore, is based on novel RTV compositions comprising derivatives of silacycloalkanes and the compositions unexpectedly display, among other things, a reduction in viscosity prior to curing, a reduction in modulus after curing and favorable cure rates.

DESCRIPTION OF THE PRIOR ART

Efforts have been described for preparing RTV compositions. In commonly assigned U.S. Pat. No. 4,959,407, solventless organopolysiloxane compositions are described and the compositions comprise a bis(ureido)silane as a coupler and an aminoxysiloxane as a crosslinker.

Additionally, in U.S. Pat. No. 4,965,367, a process for preparing silacyclobutanes is described and the process comprises the step of reacting a halogen substituted silacyclobutane with a silylating reagent.

Still other investigators have focused on the preparation of curable compositions. In U.S. Pat. No. 3,694,427, compositions comprising a silacyclobutane and an organopolysiloxane are described.

The instant invention is patentably distinguishable from the above-described, since among other reasons, it is directed to room temperature vulcanizable organopolysiloxane compositions comprising derivatives of silacycloalkanes and the compositions unexpectedly display, among other things, a reduction in viscosity prior to curing, a reduction in modulus after curing and favorable cure rates.

SUMMARY OF THE INVENTION

The room temperature vulcanizable compositions of the instant invention comprise:

(a) an organopolysiloxane capable of forming a room temperature vulcanizable composition with
(b) difunctional silacycloalkanes capable of chain extending said organopolysiloxanes; and
(c) a crosslinkers capable of crosslinking said organopolysiloxane, wherein the difunctional silacycloalkanes are incorporated into the organopolysiloxanes and remain cyclic after the room temperature vulcanizable compositions cure.

DETAILED DESCRIPTION OF THE PREFERRED EMBODIMENTS

There is no limitation with respect to the organopolysiloxanes employed in the instant invention other than that they are capable of forming room temperature vulcanizable compositions with difunctional silacycloalkanes and crosslinkers.

The organopolysiloxanes employed in this invention are known in the art and often have the formula

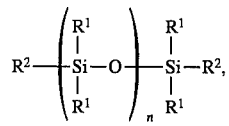

wherein each $R^1$ is independently a $C_{1-10}$ alkyl group, substituted or unsubstituted aromatic radical including a phenyl group, cyanoalkyl group including cyanoethyl, trihaloalkyl group including trifluoropropyl or a vinyl group. Each $R^2$ is independently a hydroxyl group or a substituted siloxy group having the formula,

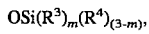

wherein $R^3$ is an alkoxy, aryloxy, amino, amido, ureido or oximo group and $R^4$ is an alkyl, vinyl group, substituted or unsubstituted aromatic radical including a phenyl group, cyanoalkyl including a cyanoethyl group, trihaloalkyl including a trifluoropropyl group, m is 2 or 3 and n is an integer from about 25 to about 5,000 and preferably has a value such that the viscosity of the organopolysiloxane is about 100 to about 100,000 and preferably from about 3,000 to about 95,000 centipoise at ambient temperature.

The difunctional silacycloalkanes are typically employed as coupling agents in this invention and often include at least one having the formulae:

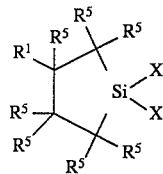

or

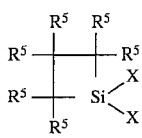
III wherein each $R^5$ is independently a $C_{1-10}$ aliphatic or alicyclic hydrocarbon, substituted or unsubstituted aromatic radical, halogen or preferably hydrogen. Each X is independently an alkoxy, aryloxy or

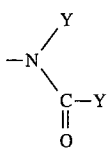

group, and each Y is independently a $C_{1-10}$ alkyl group or a substituted or unsubstituted aromatic radical. Often, it is preferred that X is a methoxy or ethoxy group and Y is a methyl group.

The difunctional siloalkanes employed in this invention are typically prepared, for instance, by reacting dihalosilacycloalkanes with a group IA metal alkoxide and an anhydrous alkanol and subsequently recovering the desired coupling agent via extraction and distillation.

The difunctional silacyoloalkanes employed in this invention remain cyclic (and therefore difunctional) prior to and after the room temperature vulcanizable compositions cure.

Additionally, it is noted herein that when the difunctional silacycloalkanes are added to the organopolysiloxanes, an increase in molecular weight is observed in the absence of gel formation. In addition to the unexpected results defined herein, this indicates that under typical conditions for processing and using the silacycloalkanes, they act as coupling agents and therefore, are incorporated into the organopolysiloxane's polymer chain/backbone to build molecular weight and not for purposes of crosslinking. The silacycloalkanes, again, remain cyclic after such incorporation, and without the employment of a crosslinker in addition to the silacycloalkane, the composition would not gel/cure.

There is no limitation with respect to the crosslinkers employed in the instant invention other than that they are capable of crosslinking organopolysiloxanes to produce a cured rubber. The often preferred crosslinkers employed in this invention are trifunctional organopolysilanes having the formula

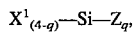
IV wherein $X^1$ is a $C_{1-10}$ hydrocarbon and preferably a methyl group and each Z is independently an alkoxy group including a methoxy group, aminoxy groups, dialkylamino groups including dimethylamino groups, oxime groups or alkoxy groups including methoxy groups and q is 3 or 4.

Such crosslinkers can be prepared for instance by reacting a hydroxyamine or an alcohol with a silicone hydride. An additional description of crosslinker production may be found in commonly assigned U.S. Pat. No. 4,959,407, the disclosure of which is incorporated herein by reference.

The room temperature vulcanizable compositions of the instant invention may be commercialized as one part or two part compositions. One part compositions are defined herein as meaning anhydrous compositions having all components mixed directly therein prior to use. Two part compositions are defined herein as meaning that not all components are directly mixed in the composition until the composition is used in its conventional manner.

The compositions of this invention may be prepared, for instance, by combining organopolysiloxanes as depicted by formula I with the difunctional silacycloalkane coupling agents as depicted by formulae II and III. The addition of other components (e.g. crosslinkers and optional catalysts), again, depends on whether or not a one part or two part composition is desired.

It is also within the scope of the instant invention to employ any conventional additives known in the art. Such additives include, for instance, group IIA carbonates and sulfates like calcium carbonate and calcium sulfate, transition metal oxides like titanium and ferric oxides, carbon black, diatomaceous earth, alumina, hydrated alumina, glass microspheres, quartz, organic fillers as well as reinforcing an nonreinforcing fillers.

Additionally, it is within the scope of the instant invention to employ any of the conventional adhesion promoters known in the art. Such adhesion promoters include, for instance, nitrogen containing silanes such as 3-aminopropyltrimethoxysilane, 3-aminoethyltriethoxysilane and N-(2-aminoethyl-3-aminopropyl)trimethoxysilane, epoxide containing silanes such as 3-(glycidioxoxypropyl)trimethoxysilane and cyanurate containing silanes such as 1,3,5-tris(3-trimethoxysilylpropyl)isocyanurate.

It is further within the scope of this invention to employ any of the known catalysts that are employed to generate RTV compositions. Often, the catalysts include condensation catalysts which contain titanium or tin, and they are employed to assist in crosslinking without causing the ring of the silacycloalkanes to open.

There is no limitation with respect to the use of the novel compositions described in the instant invention; in fact, they may be employed, for example, as protective coatings and/or caulks/sealants.

When employed as protective coatings, the novel compositions of this invention often display a percent elongation of about 50 to about 1,000% and preferably of about 100 to about 600% and most preferably of about 150 to about 400%. As caulks/sealants, the novel compositions of this invention often display a percent elongation of about 50 to about 2,000% and preferably of about 250 to about 1,000% and most preferably of about 300 to about 800%.

Additionally, the novel compositions of the instant invention unexpectedly display, prior to curing, a viscosity of about 1,000 cps to about 100,000 cps and preferably from about 3,000 cps to about 50,000 cps and most preferably from about 30,000 cps to about 50,000 cps when employed as caulks/sealants and about 3,000 to about 10,000 cps when employed as protective coatings.

The novel compositions of the instant invention unexpectedly cure to an elastomeric state (become tack-free) in about 15 minutes to about 10 hours and preferably in about 1 hour to about 6 hours and most preferably in about 2 hours to about 3 hours after being applied.

When preparing the novel compositions of this invention, the organopolysiloxanes as depicted by formula I typically have an average number molecular weight of about 500 to about 30,000 when coatings are desired and an average number molecular weight of about 10,000 to about 100,000 when caulks/sealants are desired. Moreover, low modulus after curing is defined herein as meaning a reduction in modulus of at least about 15% and preferably at least about 20% and most preferably at least about 30% at 100% elongation when compared to RTVs not comprising difunctional silacycloakanes as depicted by formulae II and III.

Generally, the novel compositions of the invention typically comprise about 2 to about 8 moles of crosslinker preferably about 3 to about 6 moles of crosslinker and most preferably about 4 to about 5 moles of crosslinker for every mole of organopolysiloxane, and said organopolysiloxane has a molecular weight from about 4,000 to about 130,000.

Additionally, it is typical for the compositions to comprise about 0.5 to about 10 moles of difunctional silacycloalkane and preferably about 0.5 to about 6 moles of difunctional silacycloalkane and most preferably about 0.5 to about 2 moles of difunctional silacycloalkane for every mole of crosslinker.

The following examples further illustrate and facilitate an understanding of the instant invention. The products obtained may be confirmed by conventional techniques such as proton and carbon-13 nuclear magnetic resonance spectroscopy, mass spectroscopy, infrared spectroscopy and GPC analysis.

EXAMPLE 1

A 1 L reaction flask was charged with sodium metal (7.85 g) and 500 mL of anhydrous methanol at a temperature of about 0°–5° C. Subsequent to sodium dissolution, dichlorosilacyclopentane (26.45 g) was added over a 45 minute period to produce a solution. The solution was stirred for about 1 hour and subsequently transferred to a 2 L separatory funnel containing 500 mL of pentane and 600 mL of water. Aqueous and organic layers were produced and separated and the aqueous layer was extracted with an additional 250 mL of pentane. The pentane extracts generated were washed with 400 mL water and 300 mL of brine and then dried by passage through a cone of anhydrous $CaSO_4$. Pentane was removed via distillation and the resulting residue (24.7 g) was distilled at atmospheric pressure. The product obtained was 1,1-dimethoxysilacyclopentane (17.32 g), 70.1% yield.

EXAMPLE 2

A 1 L reaction flask equipped with a condenser, nitrogen inlet, dropping funnel and overhead stirrer was charged with triethylamine (25.3 g) and N-methylacetamide (14.6 g in 100 mL of dry toluene. The resulting solution was chilled and 1,1-dichlorosilacyclopentane (15.5 g) dissolved in 30 mL of dry toluene, was added over 30 minutes to the mixture. The resulting slurry was stirred at ambient temperature for one hour and filtered under nitrogen. The resulting residue was washed with dry toluene and the filtrate and washings were stripped on a rotary evaporator to afford 1,1-bis-N-methylacetamideosilacyclopentane (14.9 g), 90.0% yield.

EXAMPLE 3

Example 3 was conducted in a manner similar to the one described in Example 1 except that propyl alcohol was used in lieu of methanol and the resulting product was 1,1-dipropoxysilacyclopentane.

EXAMPLE 4

A reaction flask was charged with 15.5 g of 1,1-dichlorosilacyclopentane, 20.4 g of acetic anhydride and 10 mg of anhydrous $AlCl_3$. The resulting mixture was heated to 130° C. and acetyl chloride was produced and removed by distillation at a temperature of about 55° C. The resulting residue was distilled at a reduced pressure and (15.4 g) 76.2% yield of 1,1-diacetoxysilacyclopentane was recovered.

EXAMPLE 5

A stainless steel blender was charged with organopolysiloxane composition (60 g) (69.95 parts silanol stopped polydimethylsiloxane, $R^1$=methyl and $R^2$=OH and n=500 as depicted by formula I, 2.1 parts of ethyl silicate crosslinker, 27.9 parts of $CaCO_3$ and 0.05 parts water). 1.75 g of dimethoxysilacyclopentane as prepared in Example 1 was added as a coupling agent to produce a mixture. The mixture was blended while 0.3 g of dibutyltin dilaurate catalyst were added. A thoroughly blended room temperature vulcanizable organopolysiloxane composition was obtained. The composition cured upon exposure to atmospheric moisture.

EXAMPLE 6

A composition was prepared by charging under anhydrous conditions a mixing vessel with (100 g) of organopolysiloxane composition (72.19 parts silanol stopped polydimethylsiloxane, $R^1$=methyl and $R^2$=OH and n=350 as depicted by formula I, 22.81 parts $CaCO_3$, 5 parts fumed silica, 3.2 g mol/mol 1,1-bis-N-methylacetamidosilacyclopentane coupling agent and 2.3 g of hexyl tris-N-methylacetamidosilane. The mixture was blended to produce a room temperature vulcanizable organopolysiloxane composition. The composition cured upon exposure to atmospheric moisture.

EXAMPLE 7

Example 7 was conducted in a manner similar to the one described in Example 5 except that no ethyl silicate crosslinker was employed and the silacyclopentane from Example 2 was employed in lieu of the silacyclopentane as prepared in Example 1. The resulting organopolysiloxane was a viscous fluid which did not gel and it displayed a ten fold increase in viscosity in about 2 minutes. This indicates that the silacyclopentane was incorporated into the polymer backbone for chain extension and that a crosslinker is required for gelling and curing.

The data in the table which follows has been compiled to confirm the unexpected and superior properties of the novel compositions of the instant invention. Particularly, the data indicates a decrease in modulus after the compositions cure. All entries have been prepared in a manner similar to those described in Examples 5 and 6.

TABLE

| Entry | Difunctional silacycloalkane | Modulus (100% E)[A] | (% Elongation)[B] |
|---|---|---|---|
| 1 | none | 41.6 | 189 |
| 2 | methylvinyl-bis-N-methyl-acetamidosilane | 36.9 | 419 |
| 3 | 1,1-bis-N-methylacet-amido-silacyclopentane | 27.5 | 590 |

[A]Pounds per square inch at 100% elongation.
[B]Percent elongation at break point.

What is claimed is:

1. A room temperature vulcanizable composition comprising:

(a) an organopolysiloxane capable of forming a room temperature vulcanizable composition with (b) a difunctional silacycloalkane capable of chain extending said organosiloxane; and (c) a crosslinker capable of crosslinking said organopolysiloxane, wherein the difunctional silacycloalkane is incorporated into the organosiloxane and remain cyclic after the room temperature vulcanizable composition cures.

2. A room temperature vulcanizable composition in accordance with claim 1 wherein said organopolysiloxane has the formula

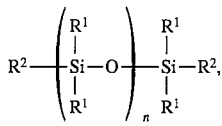

wherein each $R^1$ is independently a $C_{1-10}$ alkyl group, substituted or unsubstituted aromatic radical, cyanoalkyl, trihaloalkyl or vinyl group and each $R^2$ is independently a hydroxyl group or a substituted siloxy group having the formula $$OSi(R^3)_m(R^4)_{(3-m)},$$

wherein $R^3$ is an alkoxy, aryloxy, amido, ureido or oximo group and $R^4$ is an alkyl, substituted or unsubstituted aromatic radical, cyanoalkyl, trihaloalkyl or vinyl group and m is 2 or 3 and n is an integer from about 25 to about 5,000.

3. A room temperature vulcanizable composition in accordance with claim 2 wherein $R^1$ is a methyl group and $R^2$ is a hydroxyl group.

4. A room temperature vulcanizable composition in accordance with claim 1 wherein said difunctional silacycloalkane includes at least one compound having the formula:

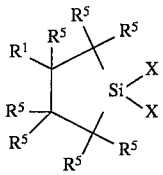

or

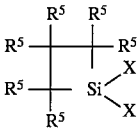

wherein each $R^5$ is independently a $C_{1-10}$ aliphatic or alicyclic hydrocarbon, substituted or unsubstituted aromatic radical, halogen or

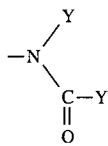

hydrogen and each X is independently an alkoxy, aryloxy or group and each Y is independently a $C_{1-10}$ alkyl group, or a substituted or unsubstituted aromatic radical.

5. A room temperature vulcanizable composition in accordance with claim 4 wherein $R^5$ is hydrogen and each X is independently a methoxy or ethoxy group and Y is a methyl group.

6. A room temperature vulcanizable composition in accordance with claim 1 wherein said crosslinker has the formula $$X^1_{(4-q)}-Si-Z_q,$$

wherein $X^1$ is a $C_{1-10}$ hydrocarbon and each Z is independently an alkoxy, aminoxy, dialkylamino, oxime or alkoxy group and q is 3 or 4.

7. A room temperature vulcanizable composition in accordance with claim 6 wherein $X^1$ is a methyl group and each Z is independently a dimethylamino or methoxy group.

8. A room temperature vulcanizable composition in accordance with claim 1 wherein said room temperature vulcanizable composition comprises about 2 moles to about 8 moles of crosslinker for every mole of organopolysiloxane and about 0.5 moles to about 10 moles of difunctional silacycloalkane for every mole of crosslinker, wherein the number average molecular weight of said organopolysiloxane is from about 4,000 to about 130,000.

9. A room temperature vulcanizable composition in accordance with claim 1 wherein said composition is a one part composition.

10. A room temperature vulcanizable composition in accordance with claim 1 wherein said composition is a two part composition.

\* \* \* \* \*